(12) United States Patent
Hong et al.

(10) Patent No.: US 11,386,856 B2
(45) Date of Patent: Jul. 12, 2022

(54) METHOD AND DEVICE FOR ADJUSTING MINI LED BACKLIGHT TELEVISION PICTURE

(71) Applicant: SHENZHEN SKYWORTH-RGB ELECTRONIC CO., LTD., Shenzhen (CN)

(72) Inventors: Wensheng Hong, Shenzhen (CN); Minghuo Yu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/275,105

(22) PCT Filed: Jun. 24, 2020

(86) PCT No.: PCT/CN2020/098025
§ 371 (c)(1),
(2) Date: Mar. 10, 2021

(87) PCT Pub. No.: WO2021/022931
PCT Pub. Date: Feb. 11, 2021

(65) Prior Publication Data
US 2022/0051634 A1    Feb. 17, 2022

(30) Foreign Application Priority Data
Aug. 6, 2019    (CN) .......................... 201910719839.3

(51) Int. Cl.
*G09G 3/34* (2006.01)
*G06T 7/90* (2017.01)
(Continued)

(52) U.S. Cl.
CPC .............. *G09G 3/3406* (2013.01); *G06T 7/90* (2017.01); *G09G 3/2007* (2013.01); *G09G 3/32* (2013.01);
(Continued)

(58) Field of Classification Search
CPC ....... G09G 3/2007; G09G 3/2018–204; G09G 3/32; G09G 3/34–3426;
(Continued)

(56) References Cited

U.S. PATENT DOCUMENTS

| 6,188,454 B1 | 2/2001 | Greene et al. |
| 2001/0040924 A1* | 11/2001 | Hori ........................ G06T 7/246 375/240.16 |

(Continued)

FOREIGN PATENT DOCUMENTS

| CN | 101155287 A | 4/2008 |
| CN | 100542211 C | 9/2009 |

(Continued)

OTHER PUBLICATIONS

The World Intellectual Property Organization (WIPO) International Search Report for PCT/CN2020/098025 dated Oct. 12, 2020 6 Pages (including translation).

*Primary Examiner* — Nathan Danielsen
(74) *Attorney, Agent, or Firm* — Anova Law Group, PLLC (57) ABSTRACT

The present disclosure relates to a method and a device for adjusting a MINI LED backlight television picture, and discloses that when a television backlight module adopts a MINI LED backlight lamp bead, according to a route of a motion track in a motion picture, the next dark field in an edge area is pre-lightened at a higher refresh rate or an edge of a bright picture is subjected to black shielding when a brightness of previous and next frames changes obviously, thereby improving the picture display effect.

13 Claims, 6 Drawing Sheets

(51) Int. Cl.
*G09G 3/20* (2006.01)
*G09G 3/32* (2016.01)

(52) U.S. Cl.
CPC .............. *G06T 2207/10016* (2013.01); *G09G 2320/0233* (2013.01); *G09G 2320/0261* (2013.01); *G09G 2360/16* (2013.01)

(58) Field of Classification Search
CPC ... G09G 2310/0243; G09G 2310/0245; G09G 2310/04–063; G09G 2320/0233–0242; G09G 2320/0252–0261; G09G 2340/10–125; G09G 2360/16; G06T 7/90; G06T 2207/10016; G06T 2207/10024
See application file for complete search history.

(56) References Cited

U.S. PATENT DOCUMENTS

| | | | | |
|---|---|---|---|---|
| 2006/0044472 A1* | 3/2006 | Lee | ................ | H04N 5/21 348/607 |
| 2009/0167194 A1* | 7/2009 | Mizuta | ................ | G09G 3/342 315/151 |
| 2010/0110112 A1* | 5/2010 | Nakanishi | ............ | G09G 3/3426 345/690 |
| 2012/0075360 A1 | 3/2012 | Messmer | | |
| 2012/0092388 A1* | 4/2012 | Kamon | ................ | G09G 3/3648 345/690 |
| 2013/0162908 A1* | 6/2013 | Son | .................... | H04N 21/8146 348/571 |
| 2015/0229919 A1 | 8/2015 | Weber et al. | | |
| 2019/0130819 A1 | 5/2019 | Chen | | |
| 2019/0137562 A1 | 5/2019 | Zha et al. | | |

FOREIGN PATENT DOCUMENTS

| | | |
|---|---|---|
| CN | 102646405 A | 8/2012 |
| CN | 103050095 A | 4/2013 |
| CN | 104769665 A | 7/2015 |
| CN | 104838440 A | 8/2015 |
| CN | 107240376 A | 10/2017 |
| CN | 108833814 A | 11/2018 |
| CN | 109637461 A | 4/2019 |
| CN | 110473504 A | 11/2019 |
| EP | 2378511 A1 | 10/2011 |
| WO | 2018215823 A1 | 11/2018 |

* cited by examiner

FIG. 1

5. 1. Lamp panel
4. (Including lamp beads)
3. 2. Optical lens
2. 3. Supporting column
1. 4. Diffusion plate
5. Diaphragm assembly Note: the number/spacing of the lamp beads on the lamp panel is determined according to the requirements of picture quality and brightness

METHOD AND DEVICE FOR ADJUSTING MINI LED BACKLIGHT TELEVISION PICTURE

CROSS-REFERENCES TO RELATED APPLICATIONS

This application is a national stage application of PCT Patent Application No. PCT/CN2020/098025, filed on Jun. 24, 2020, which claims priority to Chinese Patent Application No. 201910719839.3, filed on Aug. 6, 2019, the content of all of which is incorporated herein by reference.

FIELD OF THE APPLICATION

The present disclosure relates to the technical field of MINI LED television light control, and in particular, to a method and a device for adjusting a MINI LED backlight television picture, a smart television and a storage medium.

BACKGROUND

MINI LED backlight is actually an upgrade of LED backlight. Originally, there was only one LED light bar and brightness is spread by a light guide plate. However, the MINI LED backlight achieves backlight effect by a large number of ultra-small LED lamp groups. In this way, the MINI LED backlight not only can make the local dimming zones more exquisite to achieve the effect that a high dynamic range (HDR) presents a high contrast ratio, but also can shorten an optical distance (OD) to reduce the thickness of the whole machine and meet the requirement of thinning.

Figure 1:
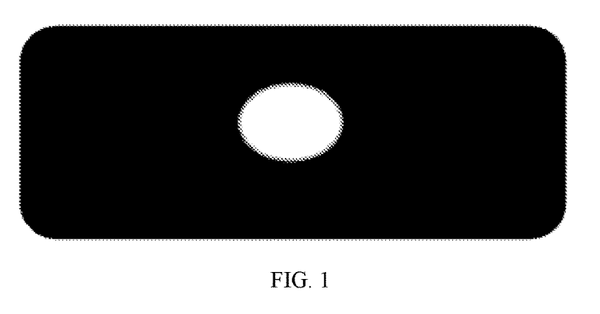
FIG. 1 illustrate a schematic diagram of an conventional LED module dynamic dimming structure.

Multi-area dynamic dimming is one of the ways to improve the picture quality of TV set. The ordinary LED backlight multi-analysis dimming is adopted at present. With the progress of the display technology and the production process, the MINI LED with higher precision is also applied to television backlight. The appearance of MINI LED backlight obviously improves the overall effect of the television picture. However, due to the fine process, the lens (optical lens) used in the traditional LED backlight module has not kept pace with the miniaturization of the MINI LED. In addition, due to the fine light control of the MINI LED, the lens is not required theoretically. However, since there is no lens, the MINI LED light path is affected by the light path of the lamp, as shown in FIG. 1, when the displayed image is similar to that the phenomenon of black shadows on the moving edge will appear when one shown bright target moves to the surrounding black area, so that the quality of the television picture is affected.

Figure 2:
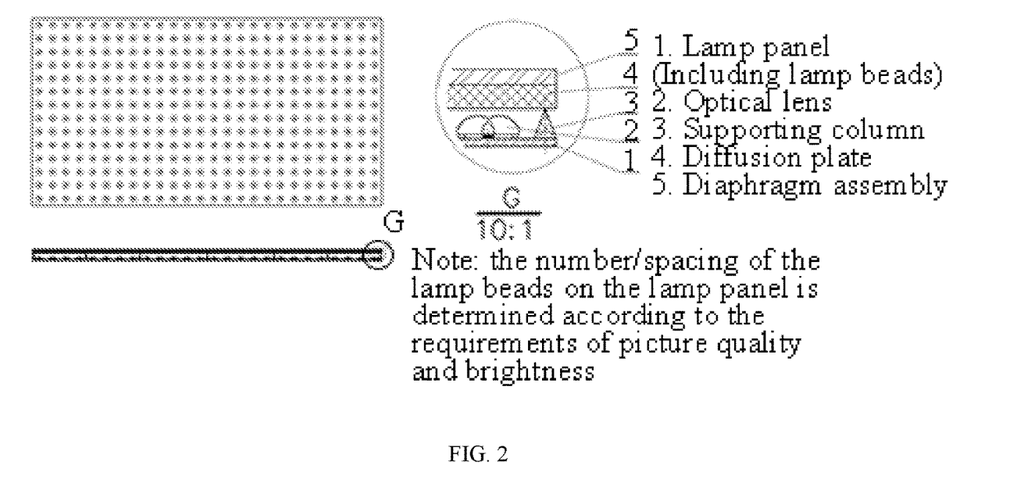
FIG. 2 illustrate a block diagram of an conventional LED module dynamic dimming structure.

As shown in FIG. 2, it is a schematic diagram of an ordinary LED module dynamic dimming structure. The module structure, over which a glass diaphragm is, comprises a diaphragm assembly 5, a diffusion plate 4, a supporting column 3, an optical lens 2 and a lamp panel 1 sequentially from top to bottom, wherein the number and spacing of lamp beads on the lamp panel are determined according to the requirements of picture quality and brightness. After the lamps on the lamp panel are turned on, light is projected to the diffusion plate through the lens, so that the LED light can be uniformly diffused and the light to the diffusion plate form light energy distribution with uniform brightness and darkness. When there is an area with obvious brightness change, the improvement requirement is met by the existing algorithm.

Figure 3:
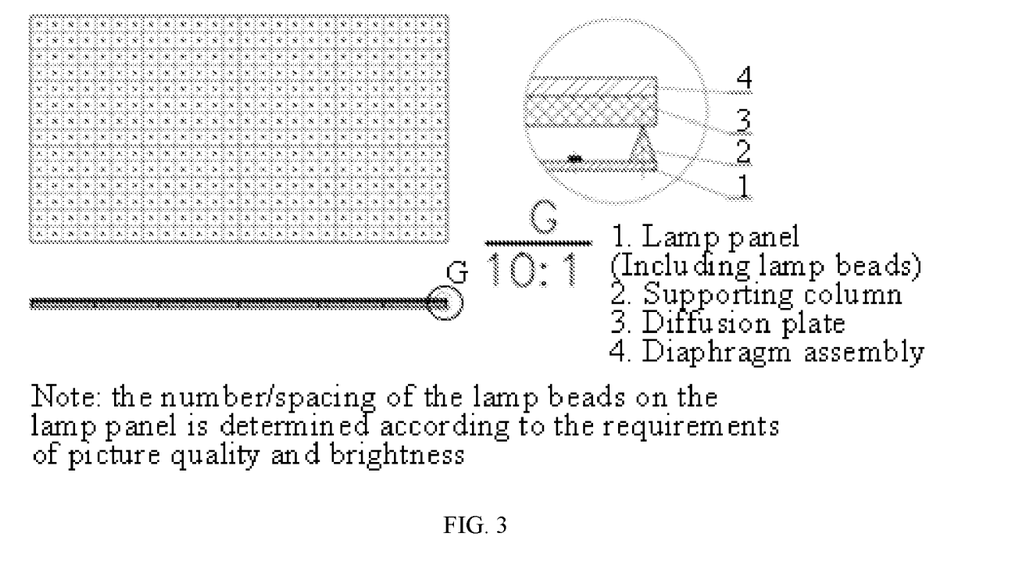
FIG. 3 illustrate a schematic diagram of a MINI LED module dynamic dimming structure.

As shown in FIG. 3, it is a schematic diagram of a MINI LED module dynamic dimming structure. Similarly, the module structure, over which a glass diaphragm is, comprises a diaphragm assembly 4, a diffusion plate 3, a supporting column 2 and a lamp panel 1 sequentially from top to bottom, wherein the number and spacing of lamp beads on the lamp panel are determined according to the requirements of picture quality and brightness. Under the condition of high fineness of the MINI LED and a large number of the lamps, the optical lens cannot be designed on the lamp beads of the MINI LED. After the lamps on the lamp panel are turned on, light is projected to the diffusion plate, so that each LED lamp is relative uniform. However, at the junction of the lamps, since there is no change on the light path caused by transparency, non-uniform brightness and darkness distribution will appears in the area where the brightness of the adjacent frames changes obviously, and the same light to the diffusion plate forms uniform brightness and darkness. Although the use of the MINI LED technology improves brightness and contrast ratio, some specific picture quality is affected negatively.

Therefore, the prior art still needs to be improved and developed.

BRIEF SUMMARY OF THE DISCLOSURE

A main objective of the present disclosure provides a method for adjusting a MINI LED backlight television picture, a smart television and a storage medium, thus solving the problem in the prior art that the MINI LED backlight module television generates shadows caused by the image of the motion picture.

To achieve the above objective, the present disclosure provides a MINI LED backlight television adjusting method. The method for adjusting a MINI LED backlight television picture comprises the following steps:

receiving audio and video input, acquiring brightness information and color information of each pixel area of each frame of image through image analysis, and providing reference data for image display optimization;

according to a relationship between frames of the image, optimizing image display effect transition of previous frame and next frame, adjusting a refresh rate of backlight control to a preset multiple of image display and pre-lightening the next frame of image at the same time; and outputting a bright and dark motion picture with uniform human-eye-perceived motion transition, and displaying a final picture on a display screen according to a driving screen image display signal.

Optionally, in the method for adjusting a MINI LED backlight television picture, the acquiring brightness information and color information of each pixel area of each frame of image through image analysis, and providing reference data for image display optimization comprises:

acquiring brightness information of a first frame of image and brightness information of a second frame of image, the first frame of image being adjacent to the second frame of image;

comparing brightness values of pixel areas of the first frame of image and the second frame of image; and recording a corresponding area and calculating a gray value when a difference value of the two brightness values is greater than a first threshold value.

Optionally, the method for adjusting a MINI LED backlight television picture further comprises: when a difference value of the two brightness values is not greater than a first threshold value, directly judging whether the current frame is the last frame of image; and if yes, ending, and if not, acquiring brightness information of the next frame of image and comparing brightness values of pixel areas of the adjacent two frames of images.

Optionally, in the method for adjusting a MINI LED backlight television picture, after the recording a corresponding area and calculating a gray value when a difference value of the two brightness values is greater than a first threshold value, the method further comprises:

judging whether the current frame is the last frame of image; and if yes, ending, and if not, acquiring brightness information of the next frame of image and comparing brightness values of pixel areas of the adjacent two frames of images.

Optionally, in the method for adjusting a MINI LED backlight television picture, the adjusting the refresh rate of backlight control to the preset multiple of image display and pre-lightening the next frame of image at the same time comprises:

in a motion picture, when two frames of images show a scene with an obvious brightness change, detecting an appearance position of the image; and according to the appearance position of the image and a degree of the brightness changes of both images, adjusting the refresh rate of backlight control to a preset multiple of image display under the condition that the image display refresh rate is unchanged, and pre-lightening the next frame of image at the same time.

Optionally, in the method for adjusting a MINI LED backlight television picture, the pre-lightening the next frame of image comprises:

acquiring a brightness and a chromaticity of a first frame of image, controlling backlight and display according to the brightness and chromaticity of the first frame of image, and reading a record chart;

judging whether the next frame of image has a change that is greater than a second threshold value, if not, controlling backlight image display according to a brightness of a pixel area of an actual frame; and if yes, reading a corresponding area and calculating a gray value, controlling a refresh rate of backlight control to be increased by a preset multiple to pre-lighten an area which is switched to bright when being dark and has a change greater than a third threshold value, and controlling image display according to a normal grayscale of the next frame of image.

Optionally, in the method for adjusting a MINI LED backlight television picture, after the controlling image display according to the normal grayscale of the next frame of image, the method further comprises:

judging whether the current frame is the last frame of image, if yes, ending, and if not, continuously judging whether the next frame of image has a change that is greater than a second threshold value.

Optionally, in the method for adjusting a MINI LED backlight television picture, before the outputting a bright and dark motion picture with uniform human-eye-perceived motion transition, the method further comprises:

performing black shielding on the picture by a current adjacent pixel bright field.

Optionally, in the method for adjusting a MINI LED backlight television picture, the performing black shielding on the picture by the current adjacent pixel bright field comprises:

acquiring a brightness and a chromaticity of a first frame of image, controlling backlight and display according to the brightness and chromaticity of the first frame of image, and reading a record chart;

judging whether the next frame of image has a change that is greater than a second threshold value, if not, controlling backlight image display according to a brightness of a pixel area of an actual frame; and if yes, reading a corresponding area and calculating a gray value, turning off backlight for a change area of the next frame of image adjacent to the current frame of image, and controlling image display according to a normal grayscale of the next frame of image.

Optionally, in the method for adjusting a MINI LED backlight television picture, after the controlling image display according to the normal grayscale of the next frame of image, the method further comprises:

judging whether the current frame is the last frame of image, if yes, ending, and if not, continuously judging whether the next frame of image has a change that is greater than a second threshold value.

Optionally, in the method for adjusting a MINI LED backlight television picture, the preset multiple is greater than 2.

In addition, to achieve the above objective, the present disclosure further provides a MINI LED backlight television adjusting device. The device for adjusting a MINI LED backlight television picture comprises:

a power supply system, an audio and video signal input port, an image core analysis module, a memory, an SPI communication interface, an image display processing module, a backlight control unit circuit, a MINI LED driving circuit and a display screen, wherein the display screen comprises a MINI LED lamp module and a T-CON board (Timing Controller board);

the audio and video signal input port is configured to provide an audio and video input interface;

the image core analysis module is configured to analyze an image and acquire information of each frame of image;

the image display processing module is configured to improve the image and transmit the image to the T-CON board;

the backlight control unit circuit is configured to receive a brightness information gray value of each pixel area through the SPI communication interface; and the display screen is configured to display the adjusted final picture.

Optionally, in the device for adjusting a MINI LED backlight television picture, the audio and video signal input port provides the audio and video input interface of a system, and the image core analysis module analyzes the image, acquires brightness information and color information of each pixel area of each frame of image to provide reference data for backlight and image display optimization, optimizes image display effect transition of previous frame and next frame by an algorithm according to a relationship between the frame and transmitting data (a brightness information gray value of each pixel area) to the backlight control unit circuit according to an algorithm and through the SPI communication interface when controlling the backlight; and when the image display is optimized and improved, the brightness and the chromaticity are transmitted to the image display processing module, the image display processing module transmits the improved image to the T-CON board, and a signal picture displayed by a driving screen image is displayed on the display screen.

In addition, to achieve the above objective, the present disclosure further provides a smart television. The smart television comprises: a memory, a processor and an MINI LED backlight television picture adjusting program which is stored in the memory and may operate on the processor, wherein the MINI LED backlight television picture adjusting program, when being executed by the processor, enables the processor to implement steps of the above method for adjusting a MINI LED backlight television picture.

In addition, to achieve the above objective, the present disclosure further provides a storage medium, wherein the storage medium stores a MINI LED backlight television picture adjusting program, and the MINI LED backlight television picture adjusting program, when being executed by the processor, enables the processor to implement steps of the above method for adjusting a MINI LED backlight television picture.

According to the present disclosure, audio and video input is received, brightness information and color information of each pixel area of each frame of image are acquired through image analysis, and reference data for image display optimization is provided; according to a relationship between frames of the image, image display effect transition of previous frame and next frame is optimized, a refresh rate of backlight control is adjusted to a preset multiple of image display and the next frame of image is pre-lightened at the same time; and a bright and dark motion picture with uniform human-eye-perceived motion transition is output, and the final picture is displayed on the display screen according to a driving screen image display signal, so that the picture display effect is improved.

DETAILED DESCRIPTION

To make the objectives, technical solutions and advantages of the present disclosure clearer, the present disclosure is further described below in detail with reference to the accompanying drawings and embodiments. It should be understood that the specific embodiments described herein are only for explaining the present disclosure, rather than for limiting the present disclosure.

Embodiment 1

Figure 4:
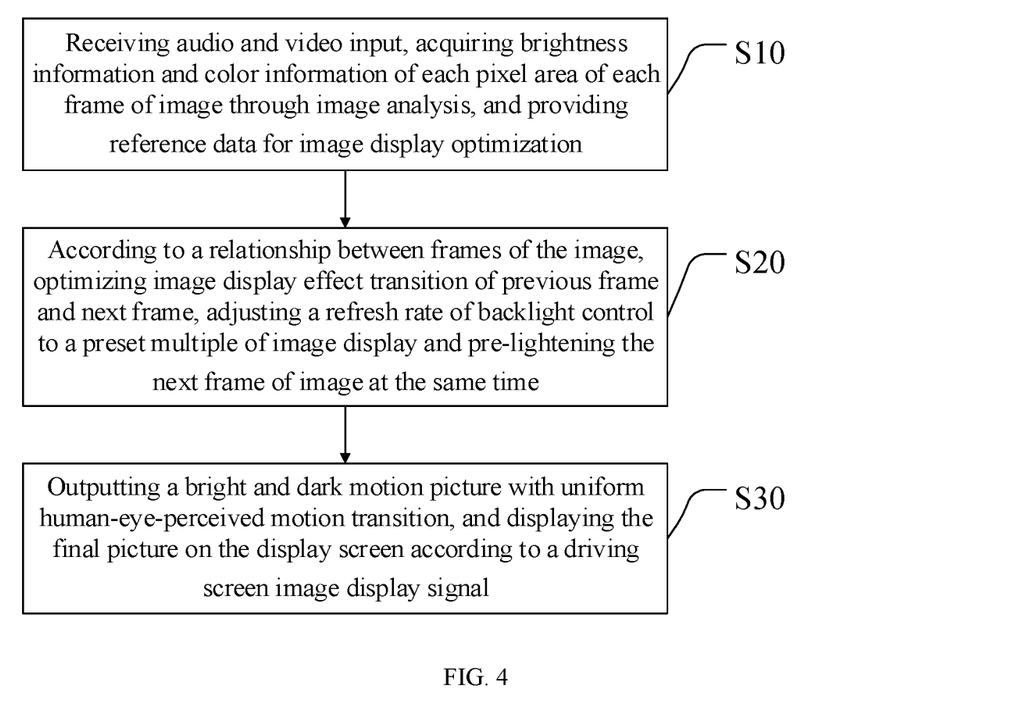
FIG. 4 illustrates a flowchart of an embodiment of a method for adjusting the MINI LED backlight television picture according to the present disclosure.

The preferred embodiment of the present disclosure provides a method for adjusting a MINI LED backlight television picture. As shown in FIG. 4, the method for adjusting a MINI LED backlight television picture comprises the following steps:

S10: audio and video input is received, brightness information and color information of each pixel area of each frame of image are acquired through image analysis, and reference data for image display optimization is provided.

Figure 5:
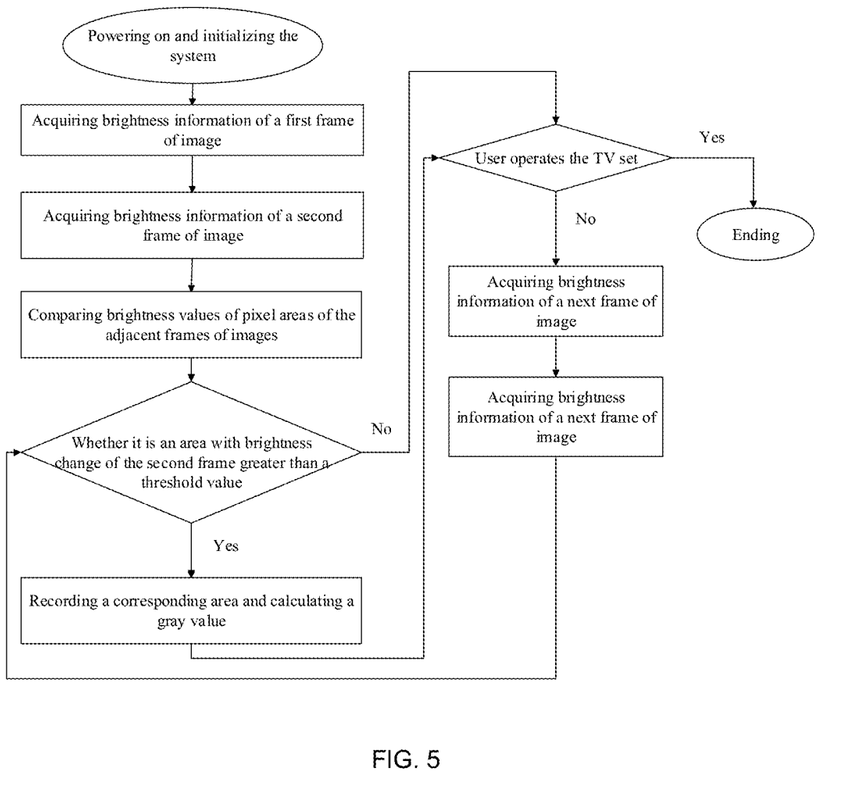
FIG. 5 illustrates a flowchart of image analysis in an embodiment of a method for adjusting the MINI LED backlight television picture according to the present disclosure.

As shown in FIG. 5, the system is powered on and initialized, and brightness information of a first frame of image and a second frame of image adjacent to each other; brightness values of pixel area of the first frame of image and the second frame of image are compared (a difference value between the brightness values is compared); whether the difference value between the brightness values is greater than a first threshold value is judged; when the difference value between the brightness values is greater than the first threshold value, a corresponding area is recorded and a gray value is calculated; when the difference value between the brightness values is not greater than the first threshold value, whether the current frame is the last frame of image is directly judged; when the difference value between the brightness values is greater than the first threshold value and after the corresponding are is recorded and the gray value is calculated, whether the current frame is the last frame of image is judged similarly; and if yes, it is ended, and if not, brightness information of the next frame of image is acquired and brightness values of pixel areas of the adjacent two frames of images is compared.

S20: according to a relationship between frames of the image, image display effect transition of previous frame and next frame is optimized, a refresh rate of backlight control is adjusted to a preset multiple of image display and the next frame of image is pre-lightened at the same time, wherein the preset multiple is greater than 2.

In a motion picture, when two frames of images show a scene with an obvious brightness change, an appearance position of the image is detected; according to the appearance position of the image and a degree of the brightness changes of both images, the refresh rate of backlight control is adjusted to a preset multiple of image display under the condition that the image display refresh rate is unchanged, and the next frame of image is pre-lightened at the same time.

Figure 6:
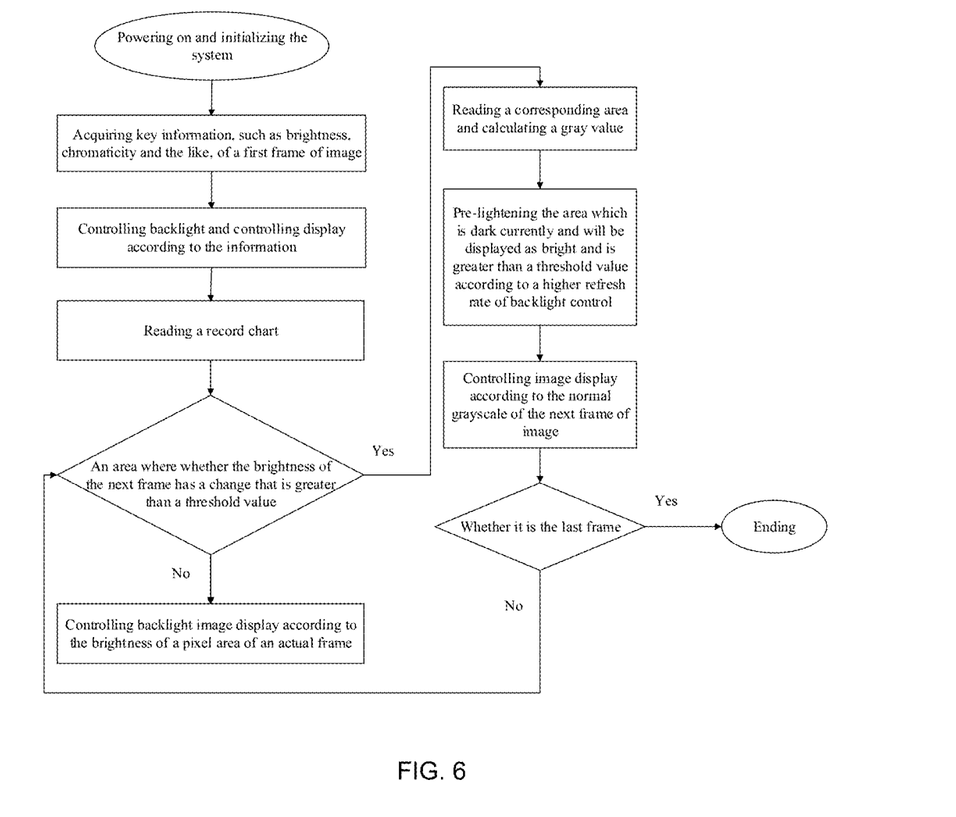
FIG. 6 illustrates a flowchart of adopting pre-lightening display in an embodiment of a method for adjusting the MINI LED backlight television picture according to the present disclosure.

Further, as shown in FIG. 6, the system is powered on and initialized, a brightness and a chromaticity of the first frame of image are acquired, backlight and display are controlled according to the brightness and chromaticity of the first frame of image, and a record chart is read; whether the next frame of image has a change that is greater than a second threshold value is judged; if not, backlight image display is controlled according to brightness of a pixel area of an actual frame; if yes, a corresponding area is read, a gray value is calculated, a refresh rate of backlight control is controlled to be increased by a preset multiple to pre-lighten an area which is switched to bright when being dark (it is dark currently and will be displayed as bright) and is greater than a third threshold value, and image display is controlled according to a normal grayscale of the next frame of image;

whether the current frame is the last frame of image is judged; and if yes, it is ended, and if not, whether the next frame of image has a change that is greater than a second threshold value is continuously judged.

S30: a bright and dark motion picture with uniform human-eye-perceived motion transition is output, and the final picture is displayed on the display screen according to a driving screen image display signal.

Before the step that a bright and dark motion picture with uniform human-eye-perceived motion transition is output, the method further comprises: the picture is subjected to black shielding by the current adjacent pixel bright field.

Figure 7:
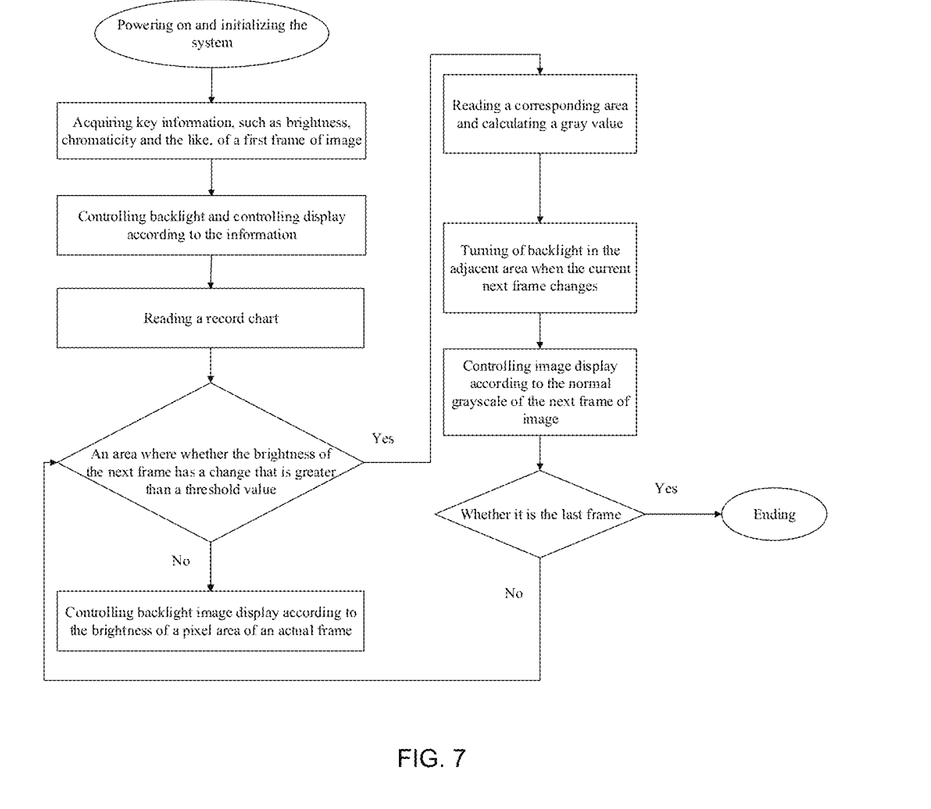
FIG. 7 illustrates a flowchart of performing black shielding by the current adjacent pixel bright field in an embodiment of a method for adjusting the MINI LED backlight television picture according to the present disclosure.

Further, as shown in FIG. 7, the system is powered on and initialized, a brightness and a chromaticity of the first frame of image are acquired, backlight and display are controlled according to the brightness and chromaticity of the first frame of image, and a record chart is read; whether the next frame of image has a change that is greater than a second threshold value is judged; if not, backlight image display is controlled according to brightness of a pixel area of an actual frame; if yes, a corresponding area is read, a gray value is calculated, backlight of a change area of the next frame of image adjacent to the current frame of image is turned off, and image display is controlled according to a normal grayscale of the next frame of image; and whether the current frame is the last frame of image is judged, if yes, it is ended, and if not, whether the next frame of image has a change that is greater than a second threshold value is continuously judged.

For the convenience of understanding the above method, specific examples are given below for description.

In the present disclosure, the refresh rate of the display screen is 60 Hz, backlight controls the frequency of the MINI LED lamp beads to be at least 120 Hb. For example, in the octal system, the maximum brightness grayscale that can be expressed is 256. In the present disclosure, when a change value between two frames in the same area is greater than L, it is considered that brightness and darkness change significantly, for example L=200. For the convenience of understanding, with reference to FIG. 8, if the current image is that there is a moving bright field area in a black field, white areas are 1, 2, 3 and 4 and just occupy four MINI LED backlight control areas, the next frame in the white areas will move to 3, 4, 5 and 6 areas and occupy four MINI LED backlight control areas of 3, 4, 5 and 6. According to the above description, assuming that the peripheral black area Lmin=0 and the gray value of the bright field area is Lmax=250, Lmax−Lmin=250>L.

Figure 8:
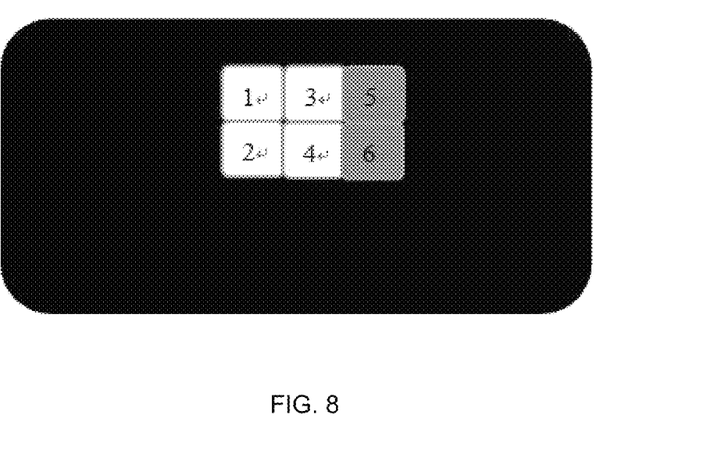
FIG. 8 illustrates an application example diagram of an embodiment of a method for adjusting the MINI LED backlight television picture according to the present disclosure.

In the current situation, since there is no lens for the lamp bead to change the light path, there will be edge shadows between 3 and 5 as well as 4 and 6. According to the present disclosure, a corresponding relationship is established between each light control area and pixel according to the number of the areas controlled by the MINI LED lamp beads. Based on the front display direction, the horizontal and vertical coordinates represent (M,N). Assuming that a 1080P television with a resolution of 1920*1080 can reach the pixel light control level, the coordinates at the upper left corner are (1,1), followed by (1,2), (1,3) . . . (2,1), (2,2), (2,3) . . . (1920,1080).

When the area grayscale difference threshold value of two frames is greater than 200 and two-field area images of 1, 2, 3 and 4 are displayed, the backlight controlled areas of 1, 2, 3 and 4 are the brightest. When it is about to display that the bright field moves to the areas of 3, 4, 5 and 6, the dark field areas of 5 and 6 are pre-lightened rapidly according to the gray value of (Lmax+Lmin)/2. When it is necessary to display the areas of 3, 4, 5 and 6, the MINI LED lamp beads are lightened according to the normal value.

Further, another manner may be used based on the above content. In FIG. 8, when two-field area images of 1, 2, 3 and 4 are displayed, the backlight controlled areas of 1, 2, 3 and 4 are the brightest. When it is about to display that the bright field moves to the areas of 3, 4, 5 and 6, the backlight of the areas 3 and 4 is turned off rapidly, then the areas 3 and 4 is turned on, and 1 and 2 are turned off at the same time. Since the transition area is subjected to black shielding rapidly, the bright and dark motion picture with uniform human-eye-perceived motion transition, thereby obviously improving effect.

Embodiment 2

Figure 9:
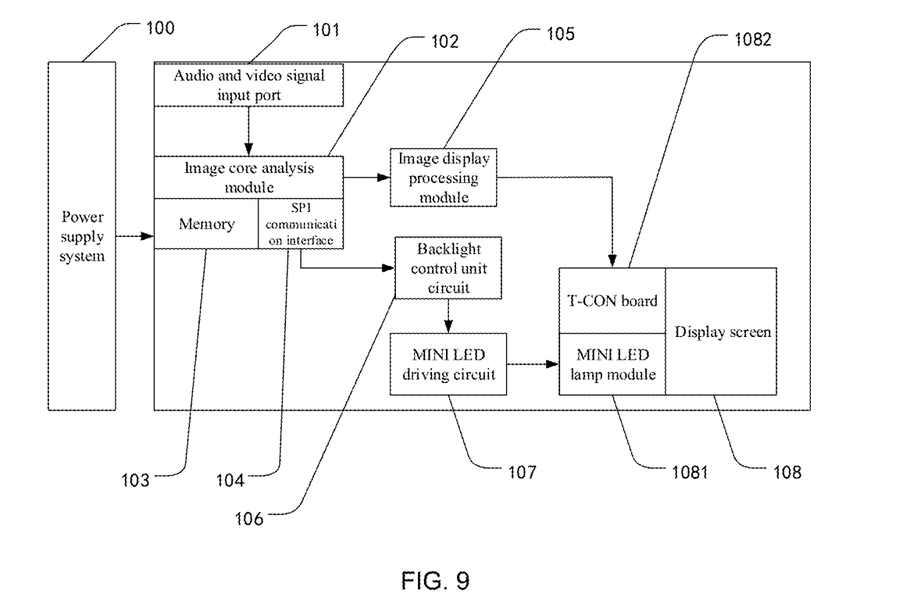
FIG. 9 illustrates a structural schematic diagram of an embodiment of a device for adjusting the MINI LED backlight television picture according to the present disclosure.

Further, as shown in FIG. 9, the present disclosure further provides a MINI LED backlight television adjusting device. The device for adjusting a MINI LED backlight television picture comprises:

a power supply system 100, an audio and video signal input port 101, an image core analysis module 102, a memory 103, an SPI communication interface 104, an image display processing module 105, a backlight control unit circuit 106, a MINI LED driving circuit 107 and a display screen 108, wherein the display screen 108 comprises a MINI LED lamp module 1081 and a T-CON board 1082; the audio and video signal input port 101 is configured to provide an audio and video input interface; the image core analysis module 102 is configured to analyze an image and acquire information of each frame of image; the image display processing module 105 is configured to improve the image and then transmit the image to the T-CON board 1082; the backlight control unit circuit 106 is configured to receive a brightness information gray value of each pixel area through the SPI communication interface 104; and the display screen 108 is configured to display the adjusted final picture.

In the device of the present disclosure, the audio and video signal input port 101 mainly provides the audio and video input interface of a system, and the image core analysis module 102 analyzes the image and acquires brightness information, color information and the like of each pixel area of each frame of image to provide reference data for backlight and image display optimization; the display effect transmission of the previous and next frames of images are optimized according to a relationship between the frames and by an algorithm, for example, when the backlight is controlled, the brightness information gray value of each pixel area is transmitted to the backlight control unit circuit 106 according to the algorithm and through the SPI communication interface 104; and for example, when image display is optimized and improved, brightness, chromaticity and the like are transmitted to the image display processing module 105, and the image is improved by the image display processing module 105 and is transmitted to the T-CON board 1082, so that the image is processed into a signal displayed by a driving screen image and the final picture is displayed on the display screen 108.

In the present disclosure, when the module is the MINI LED backlight lamp bead, the next dark field in the edge area is pre-lightened at a higher refresh rate or the edge of a bright picture is subjected to black shielding according to a route of the motion track in the motion picture when the brightness of the previous and next frames changes obviously, so that the problem of shadows caused by the image of the motion picture of the MINI LED backlight module television is solved, and the picture display effect is improved.

Figure 10:
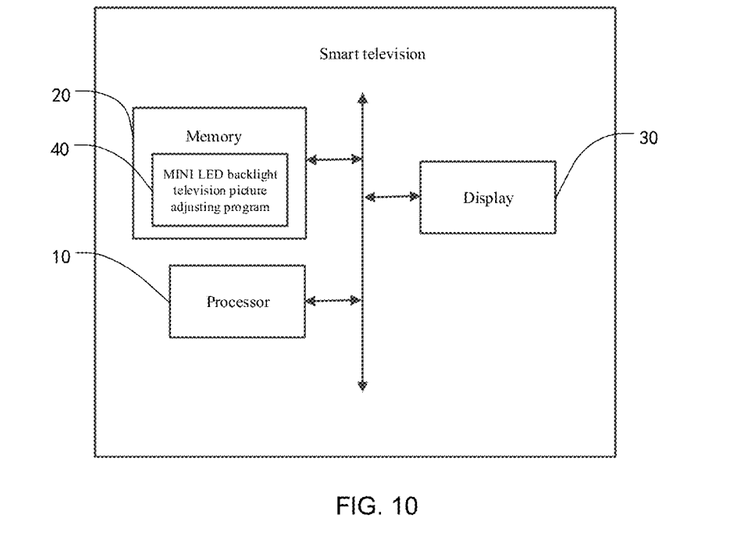
FIG. 10 illustrates a schematic diagram of an operating environment of an embodiment of a smart television according to the present disclosure.

Further, as shown in FIG. 10, the smart television further comprises: a processor 10, a memory 20 and a display 30. FIG. 10 only shows some assemblies of the smart television, but it should be understood that it is not required to implement all the shown assemblies, and more or fewer assemblies may be implemented instead.

In some embodiments, the memory 20 may be an internal memory unit of the smart television, for example a hard disk or a memory of the smart television. In some other embodiments, the memory 20 may also be an external memory device of the smart television, for example, a pluggable hard disk, a smart media card (SMC), a secure digital (SD) card, a flash card, etc. which the smart television is equipped with. Further, the memory 20 may comprise an internal memory unit of the smart television and may also comprise an external memory device. The memory 20 is configured to store application software and various data installed in the smart television, such as program codes for installing the smart television and the like. The memory 20 may further be configured to temporarily store data which has been output or is going to be output. In one embodiment, the memory 20 stores a MINI LED backlight television picture adjusting program 40. The MINI LED backlight television picture adjusting program 40 may be executed by the processor 10 so as to implement the method for adjusting a MINI LED backlight television picture of the present disclosure.

In some embodiments, the processor 10 may be a central processing unit (CPU), a microprocessor or other data processing chip for operating program codes or processing data stored in the memory 20, for example, implementing the method for adjusting a MINI LED backlight television picture.

In some embodiments, the display 30 may be an LED display, a liquid crystal display, a touch control liquid crystal display and an organic light-emitting diode (OLED) touch device, etc. The display 30 is configured to display information of the smart television and display a visual user interface. Components 10-30 of the smart television communicate with each other through system buses.

In some embodiments, when executing the MINI LED backlight television picture adjusting program 40 in the memory 20, the processor 10 implements the following steps:

audio and video input is received, brightness information and color information of each pixel area of each frame of image are acquired through image analysis, and reference data for image display optimization is provided;

according to a relationship between frames of the image, image display effect transition of previous frame and next frame is optimized, a refresh rate of backlight control is adjusted to a preset multiple of image display and the next frame of image is pre-lightened at the same time; and a bright and dark motion picture with uniform human-eye-perceived motion transition is output, and the final picture on the display screen is displayed according to a driving screen image display signal.

The step that audio and video input is received, brightness information and color information of each pixel area of each frame of image are acquired through image analysis, and reference data for image display optimization is provided comprises:

brightness information of a first frame of image and brightness information of a second frame of image are acquired, the first frame of image being adjacent to the second frame of image;

brightness values of pixel areas of the first frame of image and the second frame of image are compared; and a corresponding area is recorded and a gray value is calculated when a difference value of the two brightness values is greater than a first threshold value.

After the step that brightness values of pixel areas of the first frame of image and the second frame of image are compared, the method further comprises:

when a difference value of the two brightness values is not greater than a first threshold value, whether the current frame is the last frame of image is directly judged; and if yes, it is ended, and if not, brightness information of the next frame of image is acquired and brightness values of pixel areas of the adjacent two frames of images are compared.

After the step that a corresponding area is recorded and a gray value is calculated when a difference value of the two brightness values is greater than a first threshold value, the method further comprises:

whether the current frame is the last frame of image is judged; and if yes, it is ended, and if not, brightness information of the next frame of image is acquired and brightness values of pixel areas of the adjacent two frames of images are compared.

The step that a refresh rate of backlight control is adjusted to a preset multiple of image display and the next frame of image is pre-lightened at the same time comprises:

in a motion picture, when two frames of images show a scene with an obvious brightness change, an appearance position of the image is detected; and according to the appearance position of the image and a degree of the brightness changes of both images, the refresh rate of backlight control is adjusted to a preset multiple of image display under the condition that the image display refresh rate is unchanged, and the next frame of image at the same time is pre-lightened.

The step that the next frame of image is pre-lightened comprises:

a brightness and a chromaticity of the first frame of image are acquired, backlight and display are controlled according to the brightness and chromaticity of the first frame of image, and a record chart is read;

whether the next frame of image has a change that is greater than a second threshold value is judged, if not, controlling backlight image display according to a brightness of a pixel area of an actual frame; and if yes, a corresponding area is read and a grayscale value is calculated, controlling a refresh rate of backlight control to be increased by a preset multiple to pre-lighten an area which is switched to bright when being dark and is greater than a third threshold value, and controlling image display according to a normal grayscale of the next frame of image.

After the step that image display is controlled according to a normal grayscale of the next frame of image, the method further comprises:

whether the current frame is the last frame of image is judged, if yes, it is ended, and if not, whether the next frame of image has a change that is greater than a second threshold value is continuously judged.

Before the step that a bright and dark motion picture with uniform human-eye-perceived motion transition is output, the method further comprises:

the picture is subjected to black shielding by the current adjacent pixel bright field.

The step that the picture is subjected to black shielding by the current adjacent pixel bright field comprises:

a brightness and a chromaticity of the first frame of image are acquired, backlight and display are controlled according to the brightness and chromaticity of the first frame of image, and a record chart is read;

whether the next frame of image has a change that is greater than a second threshold value is judged, if not, backlight image display according to a brightness of a pixel area of an actual frame is controlled; and if yes, a corresponding area is read and a gray value is calculated, backlight is turned off for a change area of the next frame of image adjacent to the current frame of image, and image display is controlled according to a normal grayscale of the next frame of image.

After the step that image display is controlled according to the normal grayscale of the next frame of image, the method further comprises:

whether the current frame is the last frame of image is judged, if yes, it is ended, and if not, whether the next frame of image has a change that is greater than a second threshold value is continuously judged.

The preset multiple is greater than 2.

Embodiment 3

The present disclosure further provides a storage medium, wherein the storage medium stores a MINI LED backlight television picture adjusting program, and the MINI LED backlight television picture adjusting program, when being executed by the processor, enables the processor to implement steps of the above method for adjusting a MINI LED backlight television picture.

In conclusion, the present disclosure provides a method and a device for adjusting a MINI LED backlight television picture. The method comprises: audio and video input is received, brightness information and color information of each pixel area of each frame of image are acquired through image analysis, and reference data for image display optimization is provided; according to a relationship between frames of the image, image display effect transition of previous frame and next frame is optimized, a refresh rate of backlight control is adjusted to a preset multiple of image display and the next frame of image is pre-lightened at the same time; and a bright and dark motion picture with uniform human-eye-perceived motion transition is output, and the final picture is displayed on the display screen according to a driving screen image display signal. According to the present disclosure, when a television backlight module adopts a MINI LED backlight lamp bead, according to a route of a motion track in a motion picture, the next dark field in an edge area is pre-lightened at a higher refresh rate or an edge of a bright picture is subjected to black shielding when a brightness of previous and next frames changes obviously, thereby improving the picture display effect.

Of course, those skilled in the art may understand that all or part of processes in the above embodiment method may be implemented by instructing related hardware (such as processor, controller and the like) through a computer program. The program may be stored in a computer readable storage medium. The program may comprise the processes of the above method embodiments when being executed. The storage medium may be a memory, a magnetic disk, an optical disk or the like.

It should be understood that, the serial number of each step of the above embodiments does not indicate the order of performing the process. The order of performing each process should be determined by its function and internal logic, and shall not limit the implementation of the embodiments of the present disclosure.

It should be understood that the application of the present disclosure is not limited to the above examples and may be improved or transformed according to the above description for those skilled in the art, and all the improvements and transformations should belong to the protection scope of the appended claims of the present disclosure.

INDUSTRIAL APPLICABILITY

The embodiment of the present disclosure provides a method and a device for adjusting a MINI LED backlight television picture. When a television backlight module adopts a MINI LED backlight lamp bead, according to a route of a motion track in a motion picture, the next dark field in an edge area is pre-lightened at a higher refresh rate or an edge of a bright picture is subjected to black shielding when a brightness of previous and next frames changes obviously, thereby improving the picture display effect.

What is claimed is:

1. A method for adjusting a MINI LED backlight television picture, wherein the method comprising:

receiving audio and video input, acquiring brightness information and color information of each pixel area of each frame of image through image analysis, and providing reference data for image display optimization;

according to a relationship between frames of the image, optimizing image display effect transition of previous frame and next frame, adjusting a refresh rate of backlight control to a preset multiple of image display and pre-lightening the next frame of image at a same time, including:

acquiring a brightness and a chromaticity of a first frame of image, controlling backlight and display according to the brightness and chromaticity of the first frame of image, and reading a record chart;

judging whether the next frame of image includes an area having a brightness change that is greater than a second threshold value, if not, controlling backlight image display according to a brightness of a pixel area of an actual frame; and if yes, reading the area having the brightness change greater than the second threshold value and calculating a gray value, when the brightness change of the area is changing from dark to bright at the next frame and the gray value is greater than a third threshold value, pre-lightening the area of the next frame by increasing a refresh rate of backlight control by a preset multiple, and controlling image display according to a normal grayscale of the next frame of image; and outputting a bright and dark motion picture with uniform human-eye-perceived motion transition, and displaying a final picture on a display screen according to a driving screen image display signal.

2. The method for adjusting the MINI LED backlight television picture according to claim 1, wherein the acquiring brightness information and color information of each pixel area of each frame of image through image analysis, and providing reference data for image display optimization comprises:

acquiring brightness information of a first frame of image and brightness information of a second frame of image, the first frame of image being adjacent to the second frame of image;

comparing brightness values of pixel areas of the first frame of image and the second frame of image; and recording a corresponding area and calculating a gray value when a difference value of the two brightness values is greater than a first threshold value.

3. The method for adjusting the MINI LED backlight television picture according to claim 2, wherein after the comparing brightness values of pixel areas of the first frame of image and the second frame of image, the method further comprises:

when a difference value of the two brightness values is not greater than a first threshold value, whether the current frame is the last frame of image is directly judged; and if yes, ending, and if not, acquiring brightness information of the next frame of image and comparing brightness values of pixel areas of the adjacent two frames of images.

4. The method for adjusting the MINI LED backlight television picture according to claim 2, wherein after the recording a corresponding area and calculating a gray value when a difference value of the two brightness values is greater than a first threshold value, the method further comprises:

judging whether the current frame is the last frame of image; and if yes, ending, and if not, acquiring brightness information of the next frame of image and comparing brightness values of pixel areas of the adjacent two frames of images.

5. The method for adjusting the MINI LED backlight television picture according to claim 1, wherein the adjusting the refresh rate of backlight control to the preset multiple of image display and pre-lightening the next frame of image at the same time comprises:

in a motion picture, when two frames of images show a scene with an obvious brightness change, detecting an appearance position of the image; and according to the appearance position of the image and a degree of the brightness changes of both images, adjusting the refresh rate of backlight control to a preset multiple of image display under the condition that the image display refresh rate is unchanged, and pre-lightening the next frame of image at the same time.

6. The method for adjusting the MINI LED backlight television picture according to claim 1, wherein after the controlling image display according to the normal grayscale of the next frame of image, the method further comprises:

judging whether the current frame is the last frame of image, if yes, ending, and if not, continuously judging whether the next frame of image has a change that is greater than a second threshold value.

7. The method for adjusting the MINI LED backlight television picture according to claim 1, wherein before the outputting a bright and dark motion picture with uniform human-eye-perceived motion transition, the method further comprises:

performing black shielding on the picture by a current adjacent pixel bright field.

8. The method for adjusting the MINI LED backlight television picture according to claim 7, wherein the performing black shielding on the picture by the current adjacent pixel bright field comprises:

acquiring a brightness and a chromaticity of a first frame of image, controlling backlight and display according to the brightness and chromaticity of the first frame of image, and reading a record chart;

judging whether the next frame of image has a change that is greater than a second threshold value, if not, controlling backlight image display according to a brightness of a pixel area of an actual frame; and if yes, reading a corresponding area and calculating a gray value, turning off backlight for a change area of the next frame of image adjacent to the current frame of image, and controlling image display according to a normal grayscale of the next frame of image.

9. The method for adjusting the MINI LED backlight television picture according to claim 8, wherein after the controlling image display according to the normal grayscale of the next frame of image, the method further comprises:

judging whether the current frame is the last frame of image, if yes, ending, and if not, continuously judging whether the next frame of image has a change that is greater than a second threshold value.

10. The method for adjusting the MINI LED backlight television picture according to claim 1, wherein the preset multiple is greater than 2.

11. A smart television, comprising: a non-transitory memory, a processor and a MINI LED backlight television picture adjusting program which is stored in the memory and may operate on the processor, wherein the MINI LED backlight television picture adjusting program, when being executed by the processor, enables the processor to implement steps of the method for adjusting the MINI LED backlight television picture according to claim 1.

12. A device for adjusting a MINI LED backlight television picture, the device comprising:

a power supply system, an audio and video signal input port, an image core analysis module, a memory, an SPI communication interface, an image display processing module, a backlight control unit circuit, a MINI LED driving circuit and a display screen, wherein the display screen comprises a MINI LED lamp module and a T-CON board;

the audio and video signal input port is configured to provide an audio and video input interface;

the image core analysis module is configured to analyze an image and acquire information of each frame of image, including: acquiring a brightness and a chromaticity of a first frame of image, controlling backlight and display according to the brightness and chromaticity of the first frame of image, and reading a record chart and judging whether the next frame of image includes an area having a brightness change that is greater than a second threshold value;

the image display processing module is configured to improve the image and transmit the image to the T-CON board;

the backlight control unit circuit is configured to receive a brightness information gray value of each pixel area through the SPI communication interface, including: when the next frame of image does not include an area having a brightness change greater than the second threshold value, controlling backlight image display according to a brightness of a pixel area of an actual frame; otherwise, reading the area having the brightness change greater than the second threshold value and calculating a gray value, when the brightness change of the area is changing from dark to bright at the next frame and the gray value is greater than a third threshold value, pre-lightening the area of the next frame by increasing a refresh rate of backlight control by a preset multiple, and controlling image display according to a normal grayscale of the next frame of image; and the display screen is configured to display the adjusted final picture.

13. The device for adjusting the MINI LED backlight television picture according to claim 12, wherein the audio and video signal input port provides the audio and video input interface of a system, and the image core analysis module analyzes the image, acquires brightness information and color information of each pixel area of each frame of image to provide reference data for backlight and image display optimization, optimizes image display effect transition of previous frame and next frame by an algorithm according to a relationship between the frame and transmitting brightness information gray value of each pixel area to the backlight control unit circuit according to an algorithm and through the SPI communication interface when controlling the backlight; and when the image display is optimized and improved, the brightness and the chromaticity are transmitted to the image display processing module, the image display processing module transmits the improved image to the T-CON board, and a signal picture displayed by a driving screen image is displayed on the display screen.

* * * * *